United States Patent
Hammoud et al.

(10) Patent No.: US 6,386,179 B1
(45) Date of Patent: May 14, 2002

(54) SYSTEM AND METHOD FOR CONTROL OF CYLINDER OUTPUT TORQUE IN AN INTERNAL COMBUSTION ENGINE

(75) Inventors: Mazen Hammoud, Dearborn; Mohammad Haghgooie, Ann Arbor, both of MI (US)

(73) Assignee: Ford GLobal Tech., Inc., Dearborn, MI (US)

( * ) Notice: Subject to any disclaimer, the term of this patent is extended or adjusted under 35 U.S.C. 154(b) by 0 days.

(21) Appl. No.: 09/612,153

(22) Filed: Jul. 7, 2000

(51) Int. Cl.[7] .......................... F02D 13/02; F02D 41/14
(52) U.S. Cl. ....................................... 123/348; 123/435
(58) Field of Search ................................. 123/435, 436, 123/345–348, 90.11, 90.12, 90.13, 90.15

(56) References Cited

U.S. PATENT DOCUMENTS

| | | | |
|---|---|---|---|
| 4,104,991 A | 8/1978 | Abdoo | |
| 4,721,089 A | * 1/1988 | Currie et al. | 123/435 |
| 5,009,203 A | 4/1991 | Seki | |
| 5,022,357 A | 6/1991 | Kawamura et al. | |
| 5,072,700 A | 12/1991 | Kawamura | |
| 5,117,790 A | 6/1992 | Clarke et al. | |
| 5,161,497 A | 11/1992 | Simko et al. | |
| 5,255,637 A | 10/1993 | Schechter | |
| 5,271,229 A | 12/1993 | Clarke et al. | |
| 5,450,824 A | 9/1995 | Yamane et al. | |
| 5,469,818 A | 11/1995 | Yoshioka et al. | |
| 5,496,229 A | 3/1996 | Miyamoto | |
| 5,582,151 A | * 12/1996 | Wertheimer | 123/435 |
| 5,626,109 A | 5/1997 | Yasumura et al. | |
| 5,679,094 A | 10/1997 | Nakamura et al. | |
| 5,845,613 A | 12/1998 | Yoshikawa | |

* cited by examiner

*Primary Examiner*—Andrew M. Dolinar
(74) *Attorney, Agent, or Firm*—Ford Global Tech., Inc.

(57) ABSTRACT

A system and method for dynamically controlling the torque output of the various cylinders of a camless internal combustion engine. The system and method selectively alter the timing profiles of the engine's valves, effective to balance the torque outputs of the engine's cylinders.

12 Claims, 1 Drawing Sheet

SYSTEM AND METHOD FOR CONTROL OF CYLINDER OUTPUT TORQUE IN AN INTERNAL COMBUSTION ENGINE

FIELD OF THE INVENTION

This invention relates to a system and method for the control of cylinder output torque in an internal combustion engine and more particularly, to a system and method which selectively controls the torque output of each individual cylinder within an internal combustion engine to effect a controlled balancing of the power produced by each cylinder of the engine.

BACKGROUND OF THE INVENTION

Valve timing systems, arrangements, and assemblies are used in internal combustion engines in order to alter the timing of the opening and closing of the engine's intake and/or exhaust valves. Prior valve timing systems, typically include one or more camshafts and cam timing assemblies which selectively advance and/or delay the rotation of the one or more camshafts, thereby controlling the actuation of the intake and exhaust valves.

These prior systems and valve timing profiles used by these systems suffer from several drawbacks. Particularly, these prior cam-driven systems rely solely on the physical cam lobe profile ground into the camshaft to raise and lower the individual valves. The general power and/or torque production of an engine is the combined function of all its cylinders. The power production of each individual cylinder is a function of its valve timing as the control for the intake of the fresh fuel/air mix and the subsequent exhaust of the burnt fuel gases. Therefore, the engine's cylinder-by-cylinder power production relies on the design of the valve timing profile of the camshaft.

In production engines, the camshafts are produced with a fixed cam lobe for each valve of the engine. The camshaft production process makes each intake valve cam profile identical and each exhaust valve cam profile identical for each cylinder. This assumes that each cylinder, piston, and accompanying cylinder head combustion chamber is produced within the given and allowable tolerances, which will result in an engine that produces a substantially similar amount of power and torque from each cylinder.

In practical terms, production and manufacturing tolerances can vary distinctly and cause cylinder to cylinder power imbalances upon the engine's initial construction. Additionally, as the engine ages, cylinder components can wear at different rates, carbon and combustion byproducts can build up in the combustion chamber in varying degrees, and tolerances may open, all causing new or added engine power imbalance. More importantly, since the lobes of a mechanical camshaft are physically fixed within the engine with no ability to adjust or compensate for the power variances between the individual cylinders, the engine must continue to operate with the power imbalance causing vibration, inefficiency, and possible mechanical damage.

In other words, due to the inability of these prior systems to dynamically adjust the timing of the valves to compensate for different power outputs from each cylinder, the engine will operate in an unbalanced condition throughout its service life. As a result, the engine cannot work to full efficiency and will have vibration, shifting, and drivability problems.

Efforts have been made to increase the efficiency of vehicle engines by eliminating the camshafts and operating the intake and exhaust valves through the use of selectively controllable electromagnetic actuators. These types of systems eliminate many problems related to the physical characteristics of cam-driven systems and offer additional precision in valve timing. However, these prior camless systems are typically implemented for the purpose of improving fuel economy and emissions and do not address the imbalance between cylinders.

There is therefore a need for a new and improved valve timing system for use with a camless engine which overcomes the drawbacks associated with cylinder to cylinder power imbalances. The Applicants' invention addresses these drawbacks and provides a system and a method for dynamically controlling the valve timing events of the camless engine and which compensates for the effects of cylinder to cylinder power imbalances.

SUMMARY OF THE INVENTION

It is a first object of the invention to provide a system for cylinder to cylinder torque control in an internal combustion engine, which overcomes at least some of the previously delineated drawbacks of the prior systems, devices, and/or methods.

It is a second object of the invention to provide a method, strategy, or methodology for actuating an engine's intake and exhaust valves in a manner which balances the torque or power output of all cylinders of the engine.

According to a first aspect of the present invention, a valve timing system is provided for use with an internal combustion engine including a cylinder having at least one valve. The system includes at least one actuator which selectively actuates the at least one valve; a torque monitoring sensor which is operatively disposed within the cylinder and which is effective to measure a torque output of the cylinder and to generate a signal representing the measured torque output; and a controller which is communicatively coupled to the torque monitoring sensor and to the at least one actuator, the controller being effective to receive the signal and to cause the at least one actuator to actuate the at least one valve according to a predetermined timing profile, the controller being further effective to selectively alter the predetermined timing profile based upon the received signal, thereby selectively altering the torque output of the cylinder.

According to a second aspect of the present invention, a method is provided for controlling the valve actuation of a camless internal combustion engine of the type including a first cylinder and a second cylinder each having at least one valve which is selectively actuated for a certain duration of time. The method comprising the steps of: monitoring the actuation of the valves; monitoring a torque output of the first and second cylinders; comparing the torque output of the first cylinder to the torque output of the second cylinder; and dynamically altering the certain duration of time that the at least one valve within the first cylinder is actuated, effective to cause the torque output of the first cylinder to be substantially equal to the torque output of the second cylinder.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
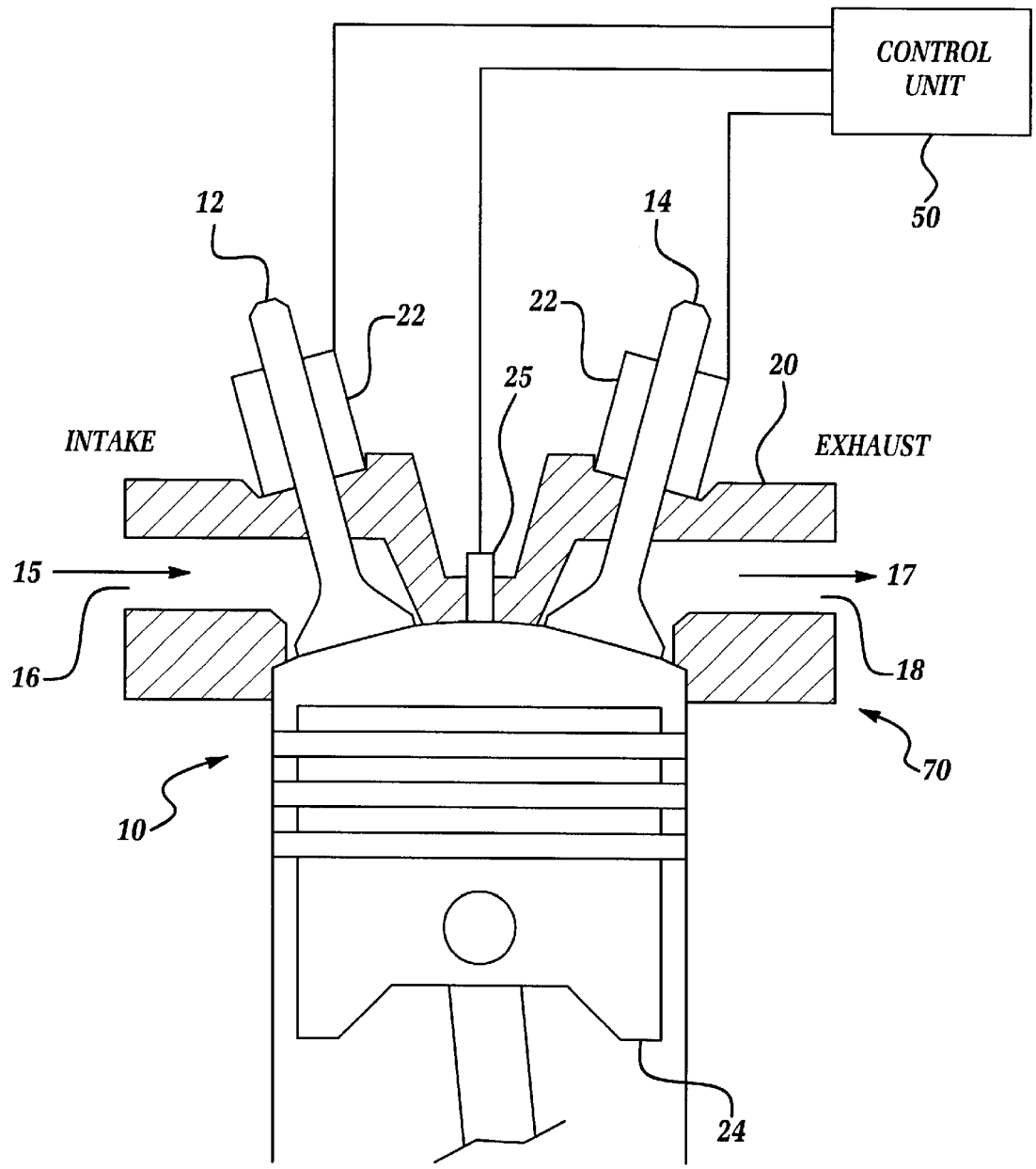
FIG. 1 is a block diagram of a system for timing the valve events of an internal combustion engine which is made in accordance with the teachings of the preferred embodiment of the present invention.

Referring now to FIG. 1, there is shown a valve timing system or assembly 70 which is made in accordance with the teachings of the preferred embodiment of the invention and which is adapted for use in combination with an internal combustion engine of the type having several substantially identical cylinders 10. Each cylinder 10 has a cylinder head 20 which includes a intake valve 12 which selectively delivers an air and fuel mixture 15 to cylinder 10 from an intake port 16, an exhaust valve 14 which selectively discharges exhaust gases 17 from the cylinder 10 through an exhaust port 18, and a conventional piston 24 which is slidably disposed within cylinder 10. While only a single cylinder 10 is shown in FIG. 1 for illustrative purposes, it should be appreciated that in the preferred embodiment, the engine comprises several substantially identical cylinders 10.

System 70 includes a control unit or controller 50, a pair of actuators 22 which are each electrically and communicatively coupled to controller 50, and a transducer 25 which is operatively disposed within cylinder head 20 and which is communicatively coupled to controller 50. As discussed more fully and completely below, controller 50 receives signals generated by the transducer 25 of each cylinder 10 and processes and utilizes the received signals to determine how the valves are to be actuated.

In the preferred embodiment, controller 50 is a conventional controller including one or more microprocessors and sub-processors, which cooperatively perform the below-described processes. In one alternate embodiment, controller 50 comprises a portion of a conventional engine control unit ("ECU"). In another alternate embodiment, controller 50 is externally coupled to the engine control unit.

Transducers 25 comprise conventional and commercially available torque or power output sensors. Transducers 25 are effective to measure each cylinder's power output by measuring cylinder pressure and to respectively generate and communicate signals to controller 50 (and/or to an engine control unit) representing the measured values. Controller 50 receives the signals and is effective to sense or detect variations in torque output from any one or more of cylinders 10 based upon the received signals. As described more fully and completely below, controller 50 then selectively lengthens or shortens the duration or period of time that the intake valves 12 remain in an actuated or "open" position in response to such a detection.

Actuators 22 are conventional electromechanical or electrohydraulic valve actuators, which are effective to receive signals from controller 50 and to actuate valves 12, 14 in response to the received signals. It should be appreciated that in a multi-cylinder engine, a unique actuator 22 is utilized for each of the valves 12, 14 and each of the actuators 22 is independently coupled to controller 50. In this manner, each of valves 12, 14 may be selectively and independently controlled by controller 50.

In operation, controller 50 determines whether a variance in torque output is occurring within any of cylinders 10 (e.g., whether the data received from transducers 25 indicates such a variance within one of cylinders 10). Particularly, controller 50 determines whether the output torque of each cylinder is greater than, less than, or equal to a predetermined "standard" or desired value or range of values. In one non-limiting embodiment, the desired value or range is based on the output torque of one or more "target" cylinders within the engine. Once controller 50 has identified any "variant" cylinder(s) (e.g., cylinders having an output torque greater than or less than the desired value or range), controller 50 interrupts the current valve timing profile or strategy stored within controller 50 for only the one or more identified cylinders, and provides a modified control signal to the specific valve actuators 22 which are associated with the identified cylinder(s).

In one non-limiting embodiment, the modified control signal is effective to alter the duration of time in which valves 12, 14 remain in an actuated or open position, and/or the duration of time that the valves are opened relative to each other and/or relative to the stroke of piston 24. For example and without limitation, if the measured output torque of a cylinder is greater than the desired value or range (e.g., if the output torque is greater than the output torque of the "target" cylinder), controller 50 selectively reduces the amount of air and fuel (i.e., the "air charge mass") that is introduced into that cylinder, in order to lower the torque output within the cylinder. Particularly, controller 50 communicates a signal to actuator 22 effective to selectively shorten the duration that intake valve 12 remains open. This shortened actuation of intake valve 12 reduces the amount of air and fuel that is introduced into the cylinder 10, thereby lowering the torque output within the cylinder 10. System 70 achieves this suppression dynamically, while the vehicle is operating and without effecting the valve timing within the other properly operating cylinders. Controller 50 continues to monitor the torque output of the variant cylinder and will continue to decrease the period of time that the valve 12 remains open until the torque output of the cylinder reaches the desired value or range. In one non-limiting embodiment, controller 50 continues to decrease the period of time until the output torque of the cylinder becomes substantially equal to the output torque of the target cylinder.

Additionally, if the output torque of a cylinder is less than the desired value (e.g., if the output torque is less than the output torque of a "target" cylinder), controller 50 selectively increases the output torque within cylinder 10 by selectively increasing the amount of fuel/air mixture that is introduced into cylinder 10. Particularly, controller 50 communicates a signal to actuator 22 effective to selectively increase the duration of time that intake valve 12 remains open, thereby increasing the amount of fuel/air mixture that is introduced into cylinder 10. This increase in valve timing duration also occurs dynamically, while the vehicle is operating and without effecting the valve timing within the other properly operating cylinders. Controller 50 continues to monitor the torque output of the variant cylinder will continue to increase the period of time that valve 12 remains open until the torque output reaches the desired value or range. In one non-limiting embodiment, controller 50 continues to increase the period of time until the output torque of the cylinder becomes substantially equal to the output torque of the target cylinder. In this manner, the system 70 is able to selectively and dynamically alter torque output within various individual cylinders 10 of an internal combustion engine, without effecting the valve timing strategy or profile of the other cylinders.

It should be noted however, that increasing torque output may be limited by other factors and conditions that are undesirable to introduce into the cylinder 10. Particularly, excessive increase in the amount of time that the intake valves remain open may cause too dense an air mass charge causing a "knock" condition. In one non-limiting embodiment, controller 50 is capable of determining whether the requested or desired increase will cause a potential knock condition, and controller 50 is effective, in response to such a determination, to alter some or all of the other valve timing profiles to achieve torque output balancing among the cylinders. For example and without limitation, controller 50 may selectively reduce the amount of time that the intake valves of the other cylinders remain open, thereby reducing the torque output of the other cylinders.

The benefit of this design is the continuous dynamic, individual cylinder-by-cylinder adjustment of the valve timing profiles to achieve a torque balanced engine throughout the service life of the vehicle. In another non-limiting embodiment, the system 70 may also be initiated at the production facility allowing the manufacturer to specifically set as an initial calibration, a cylinder to cylinder torque balance before the vehicle leaves the production facility. In this manner, the manufacturer can insure that the engine is torque balanced and that no internal defects in the specific engine have occurred or would prevent the system 70 from dynamically maintaining the cylinder to cylinder torque calibration.

It is to be understood that the invention is not to be limited to the exact construction and/or method which has been illustrated and discussed above, but that various changes and/or modifications may be made without departing from the spirit and the scope of the invention.

What is claimed is:

1. A valve timing system for use with an internal combustion engine of the type including a cylinder having at least one intake valve, said system comprising:
    at least one actuator which selectively actuates said at least one intake valve;
    a torque monitoring sensor which is operatively disposed within said cylinder and which is effective to measure a torque output of said cylinder and to generate a signal representing said measured torque output; and
    a controller which is communicatively coupled to said torque monitoring sensor and to said at least one actuator, said controller being effective to receive said signal and to cause said at least one actuator to actuate said at least one intake valve according to a predetermined timing profile, said controller being further effective to selectively alter said predetermined timing profile based upon said received signal, thereby selectively altering said torque output of said cylinder;
    wherein said at least one actuator is effective to actuate said intake valve for a certain duration of time in which a certain amount of air and fuel enters said cylinder and wherein said controller is further effective to determine whether said torque output is greater than a certain value and to selectively shorten said certain duration of time in response to said determination, effective to decrease said certain amount of air and fuel, thereby reducing said torque output of said cylinder.

2. The valve timing system of claim 1 wherein said controller is further effective to determine whether said torque output is less than a certain value and to selectively lengthen said certain duration of time in response to said determination, effective to increase said certain amount of air and fuel, thereby increasing said torque output of said cylinder.

3. The valve timing system of claim 2 wherein said at least one actuator comprises an electromechanical actuator.

4. The system of claim 2 wherein said at least one actuator comprises an electrohydraulic actuator.

5. The system of claim 2 wherein said controller comprises a portion of an engine control unit.

6. A method for controlling valve actuation in a camless internal combustion engine of the type including a first cylinder and a second cylinder each having at least one valve which is selectively actuated for a certain duration of time, said method comprising the steps of:
    monitoring the actuation of said valves;
    monitoring a torque output of said first and second cylinders;
    comparing said torque output of said first cylinder to said torque output of said second cylinder;
    dynamically altering said certain duration of time that said at least one valve within said first cylinder is actuated, effective to cause said torque output of said first cylinder to be substantially equal to said torque output of said second cylinder; and
    if said torque output of said first cylinder is greater than said torque output of said second cylinder, then reducing said duration of time that said at least one intake valve within said first cylinder is actuated, effective to reduce said amount of air and fuel, thereby reducing said torque output of said first cylinder;
    wherein said at least one valve comprises an intake valve which is effective to communicate an amount of air and fuel into said first and said second cylinders.

7. The method of claim 6 further comprising the step of:
    if said torque output of said first cylinder is less than said torque output of said second cylinder, then increasing said duration of time that said at least one intake valve within said first cylinder is actuated, effective to increase said amount of air and fuel, thereby increasing said torque output of said first cylinder.

8. The method of claim 7 wherein said torque output of said first and second cylinders is respectively monitored by use of a first and second transducer.

9. The method of claim 6 wherein said at least one valve is selectively actuated by use of at least one electromechanical actuator.

10. The method of claim 6 wherein said at least one valve is selectively actuated by use of at least one electrohydraulic actuator.

11. A method for valve timing for use with an internal combustion engine including a cylinder having at least one valve, said method comprising the steps of:
    providing at least one actuator which selectively actuates said at least one valve according to a certain valve timing profile;
    providing a torque monitoring sensor which is effective to measure a torque output of said cylinder and to generate a signal representing said measured torque output;
    operatively disposing said torque monitoring sensor within said cylinder;
    receiving said signal;
    comparing said signal to a predetermined value; and
    selectively altering said certain valve timing profile based upon said comparison, thereby selectively altering said torque output of said cylinder and;
    determining whether said output torque is greater than said predetermined value and to selectively shorten said certain duration of time in response to said determination, effective to decrease said certain amount of air and fuel, thereby reducing said torque output of said cylinder;

wherein said at least one valve comprises an intake valve and said at least one actuator is effective to actuate said intake valve for a certain duration of time in which a certain amount of air and fuel enters said cylinder.

12. The valve timing system of claim 11 further comprising the step of:

selectively lengthening said certain duration of time if said output torque is less than said predetermined value, effective to increase said certain amount of air and fuel, thereby increasing said torque output of said cylinder.

* * * * *